United States Patent [19]

Gardner

[11] 4,313,859
[45] Feb. 2, 1982

[54] COMPOSITION CONTAINING A HALF ESTER OF AN ORGANIC POLYOL, AN UNSATURATED MONOMER, AN EPOXIDE, AND A BASIC COMPOUND

[75] Inventor: Hugh C. Gardner, Somerville, N.J.

[73] Assignee: Union Carbide Corporation, New York, N.Y.

[21] Appl. No.: 171,081

[22] Filed: Jul. 28, 1980

Related U.S. Application Data

[63] Continuation-in-part of Ser. No. 147,098, May 7, 1980, abandoned, which is a continuation of Ser. No. 70,007, Aug. 27, 1979, abandoned.

[51] Int. Cl.$^3$ .................. C08G 59/42; C08G 63/42
[52] U.S. Cl. .................. 260/18 PF; 260/37 EP; 260/42.28; 525/329; 525/502; 528/33; 528/37; 528/93; 528/95; 528/110; 528/115; 528/361; 528/365; 528/26; 525/281; 525/285; 525/531; 525/532; 526/261; 526/271
[58] Field of Search ........... 260/18 PF, 37 EP, 42.28; 528/103, 110, 115, 33, 37, 361, 365, 93, 95, 26; 525/329, 281, 285, 531, 532, 502; 526/271, 261

[56] References Cited

U.S. PATENT DOCUMENTS

| | | | |
|---|---|---|---|
| 2,890,194 | 6/1959 | Phillips et al. | 260/45.4 |
| 2,890,197 | 6/1959 | Phillips et al. | 260/45.4 |
| 3,089,863 | 5/1963 | Hicks et al. | 260/75 |
| 3,375,301 | 3/1968 | Case et al. | 260/869 |
| 3,506,736 | 4/1970 | Najvar | 260/835 |
| 3,516,955 | 6/1970 | Taft | 260/22 |
| 3,784,586 | 1/1974 | Thomas et al. | 260/861 |
| 4,086,294 | 4/1978 | Koleske et al. | 260/834 |
| 4,137,279 | 1/1979 | Smith et al. | 260/861 |

FOREIGN PATENT DOCUMENTS 518346 9/1953 Belgium .

*Primary Examiner*—Earl A. Nielsen
*Attorney, Agent, or Firm*—Donald M. Papuga

[57] ABSTRACT

The invention comprises a polymerizable liquid mixture of (a) a half ester characterized by the following empirical formula:

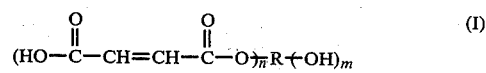

wherein n is a number having an average value of about 1.5 to less than about 4, m is equal to the free valence of R less the average value of n, R is the hydroxyl-free residue of an organic polyol which contained from 2 to 4, inclusive, hydroxyl groups, OH, in formula (I) (b) maleic anhydride, (c) an epoxide containing two or more 1,2-epoxide radicals, (d) an ethylenically unsaturated monomer which forms a liquid homogeneous mixture with the half ester, maleic anhydride and epoxide, and (e) a basic compound.

18 Claims, No Drawings

COMPOSITION CONTAINING A HALF ESTER OF AN ORGANIC POLYOL, AN UNSATURATED MONOMER, AN EPOXIDE, AND A BASIC COMPOUND

This application is a continuation-in-part of our prior U.S. Patent Application Ser. No. 147,098, filed May 7, 1980, now abandoned, which in turn is a Continuation Application of U.S. Patent Application Ser. No. 070,007, filed Aug. 27, 1979, which is now abandoned.

This invention is directed to polymerizable compositions which can be employed in the manufacture of shaped articles, and particularly in the manufacture of fiber-reinforced plastic compositions. The polymerizable composition of this invention is a mixture of low molecular weight monomeric or oligomeric structures which when cured yield a thermoset crosslinked composition of high stiffness and strength. FRP made with the compositions of this invention are especially suitable for automative applications and appliance housings.

Fiberglass has been widely used as a reinforcement in the manufacture of thermoset molded articles. These types of articles have been termed "Glass Reinforced Plastics" (GRP) and "Glass Fiber Reinforced Plastics" (FRP). The fiberglass content in these thermoset molded articles ranges from about 15 to about 70–80 weight percent. Polyester resins are often used as the resin component in these glass reinforced thermoset plastics.

An unsaturated polyester widely used in GRP for automative applications is made from maleic anhydride and propylene glycol. However, due to the requirements of increased toughness, newer commercial polesters utilized in automative applications are frequently more complex in their structure. They are typically derived from the co-reaction of maleic anhydride, isophthalic or terephthalic acids, or their esters, and glycols, such as propylene glycol, dipropylene glycol and/or ethylene glycol. Maleic anhydride or acid is a starting component in these polyesters. The molecular weight (Mn) of these polyesters can range from about 500 to 5,000. However, most of the commercial polyesters have molecular weights (Mn) of from about 1,300 to 2,500 and are randomly terminated with carboxyl or hydroxyl moieties.

U.S. Patent Application Ser. No. 129,884, filed Mar. 27, 1980, in the names of H. C. Gardner, et al., now U.S. Pat. No. 4,263,413, issued Apr. 21, 1981, and titled "Half Esters of Organic Polyols And A Process For Their Production", describes a composition comprising a homogeneous liquid mixture of (a) a half ester of an organic polyol characterized by the following empirical formula:

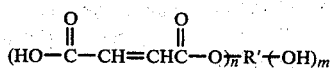

wherein n is a number having an average value of about 1.8 to less than about 4, m is equal to the free valence of R' less than average value of n, R' is the hydroxyl-free residue of an organic polyol which contained from 2 to 4, inclusive, hydroxyl groups, OH, in the formula, (b) maleic anhydride, (c) an ethylenically unsaturated monomer which forms a liquid homogeneous mixture with and is copolymerizable with the half ester and maleic anhydride, and (d) a basic compound. This composition may additionally contain one or more reinforcing fibers having a melting point or a glass transition temperature above about 130° C.

The composition as described in U.S. Patent Application Ser. No. 129,884, supra, is a homogeneous liquid mixture which does not form a precipitate on standing.

THE INVENTION

This invention is directed to a composition of a half ester of an organic polyol, maleic anhydride, an ethylenically unsaturated monomer, an epoxide containing two or more 1,2-epoxide radicals, and a base. It has been found that cured articles formed from the epoxide-containing compositions of this invention possess increased toughness as well as reduced water sorption in comparison to those cured articles formed from the compositions of U.S. Patent Application Ser. No. 129,884.

For example, a casting produced from a mixture containing the reaction product of a 2:1 molar mixture of maleic anhydride with dipropylene glycol, and styrene, has a tensile strength of 2,800 psi and an ultimate tensile elongation of 0.3 percent. When an epoxide containing two or more 1,2-epoxide radicals is added to this formulation, and a casting produced therefrom, both properties are greatly increased. Tensile strength increases to over 10,000 psi and the elongations greater than 3 percent are achieved. Further, when the casting without the epoxide is subjected to boiling water, a large weight gain is seen as well as surface corrosion after a 4 hour exposure. The epoxide containing casting, however, displays only a small weight gain and does not appear corroded.

Copending U.S. Patent Application Ser. No. 129,884 describes half esters of many polyols which are suitable for forming homogeneous mixtures with vinyl monomers. However, at room temperature there are only a limited number of polyols which afford adducts with maleic anhydride that are soluble in styrene. For example, 2,2,4-trimethyl-1,3-pentanediol yields a product with maleic anhydride which is soluble. However, two phase liquid mixtures are obtained when styrene is added to the maleic anhydride reaction products of either propylene glycol or diethylene glycol. It has now been found that the addition of an epoxide containing at least two 1,2-epoxide radicals to such two phase mixtures results in the formation of single homogeneous mixtures at room temperature. These mixtures may then be cured to give uniform rigid parts.

The composition of this invention comprises a curable polymerizable liquid mixture of (a) a half ester of the following empirical formula:

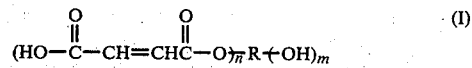

wherein n is a number having an average value of about 1.5 to less than about 4, m is equal to the free valence of R less the average value of n, R is the hydroxyl-free residue of an organic polyol which contained from 2 to 4, inclusive, hydroxyl groups, OH, in formula (I), (b) maleic anhydride, (c) an epoxide containing two or more 1,2-epoxide radicals, (d) an ethylenically unsaturated monomer which forms a liquid homogeneous mixture with (a), (b) and (c), and (e) a basic compound.

The half ester of the organic polyol is characterized by the following empirical formula:

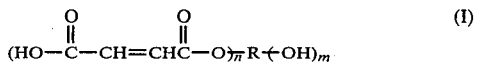

(HO—C—CH=CHC—O)ₙR(OH)ₘ    (I)

This half ester is formed by the reaction of maleic anhydride and an organic polyol. The reaction product contains at least 1.5 ester groups. If the polyol contains 4 hydroxyl groups, the reaction product can possess up to 4 half ester groups. If the number of half ester groups is less than the number of hydroxyl groups available from the polyol, the reaction product will contain residual hydroxyl groups. Typically, the maleic anhydride content of the composition does not exceed a total of about 20 mole percent of the amount of maleic anhydride employed in producing the half ester.

The organic polyol which is reacted with maleic anhydride to form the half ester depicted by empirical formula (I), is typically a polyol which contains at least two carbon atoms and which may contain from 2 to 4, inclusive, hydroxyl groups. These polyols include alkane diols, triols, tetraols, aliphatic ether containing diols, triols, tetraols, cycloaliphatic containing diols, triols, and tetraols, and aromatic containing diols, triols, and tetraols, and the like. Specific illustrations of organic polyols suitable in the practice of this invention include the following: ethylene glycol, diethylene glycol, 2,2,4-trimethyl-1,3-pentanediol, dipropylene glycol, propylene glycol, 2,2-dimethyl-1,3-propanediol, polypropylene glycol having an average molecular weight of about 150 to about 600 and having 2 to 4 terminal hydroxyl groups, triethylene glycol, 1,4-cyclohexanedimethanol, 2,2-dimethyl-3-hydroxypropyl 2,2-dimethyl-3-hydroxypropionate, triethanolamine, 1,3-butanediol, tetraethylene glycol, 2,2-bis(4-hydroxyphenyl)propane and the ethylene and propylene oxide adducts of 2,2-bis(4-hydroxyphenyl)propane pentaerythritol, erythritol, glycerine, trimethylolpropane, 1,4-butanediol, 1,6-hexanediol, tripropylene glycol, 2,2-bis(4-hydroxycyclohexyl)propane, 1,2,6-hexane triol, 1,3-propanediol, and the like. The most preferred organic polyols are 2,2-dimethyl-3-hydroxypropyl 2,2-dimethyl-3-hydroxypropionate, 2,2,4-trimethyl-1,3-pentanediol, propylene glycol, diethylene glycol, and the ethylene oxide and propylene oxide adducts of 2,2-bis(4-hydroxyphenyl)propane. The use of mixtures of the aforementioned polyols in producing half esters is very desirable.

As described below, the half ester of formula (I) is formed by reacting maleic anhydride with the polyol. Since the reaction is reversible, a portion of the original charge of maleic anhydride is carried into the final product. Therefore, the maleic anhydride/polyol reaction product contains both the half ester of formula (I) and maleic anhydride.

The epoxides containing two or more 1,2-epoxide radicals which are suitable for use in this invention are of two general types. The first contains a plurality of 1,2-epoxide groups derived from the reaction of a polyfunctional active hydrogen containing compound with an excess of an epihalohydrin under basic conditions. These epoxides are called polyglycidyl compounds. When the active hydrogen compound is a polyhydric alcohol or phenol, the resulting epoxide composition contains glycidyl ether groups. A preferred group of polyglycidyl compounds are made via condensation reactions with 2,2-bis(4-hydroxyphenyl)propane, also known as bisphenol A, and have structures such as the following:

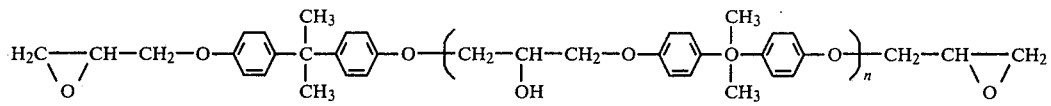

where n has a value from about 0 to about 10. These epoxides are bisphenol-A epoxy resins. They are available commercially under the trade names such as "Epon 828," "Epon 1004", and "Epon 1010" from Shell Chemical Co. and "DER 331", "DER 332", and "DER 334" from Dow Chemical Co. The most preferred bisphenol A epoxy resins have an "n" value between 0 and 2.

Other polyfunctional active hydrogen compounds can be used to make polyglycidyl adducts suitable for use in the practice of this invention. These include amines, amino alcohols and polycarboxylic acids. Adducts derived from amines and aminophenols include N,N-diglycidyl propylaniline N,N,N', N'-tetraglycidyl-4,4'-diamino-diphenyl methane, O,N,N-triglycidyl-4-aminophenol or N,N'-dimethyl-N,N'-diglycidyl-4,4'-diamino-diphenylmethane.

Polyepoxides which are polyglycidyl ethers of 4,4'-dihydroxy diphenyl methane, 4,4'-dihydroxy diphenyl sulfone or tris(4-hydroxyphenyl)methane are useful in this invention.

Also suitable for use herein are the glycidyl esters of carboxylic acids. Such glycidyl esters include, for example, diglycidyl phthalate and diglycidyl adipate. Polyepoxides prepared from polyols such as pentaerythritol, glycerol, butanediol or trimethylol propane and an epihalohydrin are also useful. There may also be used polyepoxides such as triglycidyl cyanurates and isocyanurates, N,N-diglycidyl oxamides, N,N'-glycidyl derivatives of hydantoins, diglycidyl esters of cycloaliphatic dicarboxylic acids, and polyglycidyl thioethers of polythiols.

Other epoxy-containing materials are copolymers of acrylic acid esters of glycidol such as glycidyl acrylate and glycidyl methacrylate with one or more copolymerizable vinyl compounds. Examples of such copolymers are 1:1 styrene-glycidyl methacrylate, 1:1 methylmethacrylate-glycidyl acrylate and 62.5:24:13.5 methylmethacrylate:ethyl acrylate:glycidyl methacrylate.

Silicone resins containing epoxy functionality (e.g. 2,4,6,8,10-pentakis [3-(2,3-epoxypropoxy)propyl]-2,4,6,8,10-pentamethylcyclopentasiloxane and the diglycidyl ether of 1,3-bis-(3-hydroxypropyl)tetramethyldisiloxane) are also useable.

Many suitable polyglycidyl compounds are available commercially. In addition to the bisphenol-A epxoy resins mentioned above, these include flame retardant epoxy resins (e.g., "DER-580", a brominated bisphenol type epoxy resin available from Dow Chemical Co.), 1,4-butanediol diglycidyl ether (e.g., "Araldite RD-2" from Ciba-Geigy Corporation), polyglycidyl ether of phenol-formaldehyde novalak (e.g., "DEN-431" and "DEN-438" from Dow Chemical Co.)., polyglycidyl ether of cresol formaldehyde novolak (e.g., ECN-1273 from Ciba-Geigy Corporation), N,N'-diglycidyl derivative of dimethyl hydantion, (e.g., XB-2793 from Ciba Geigy Corporation), resorcinal diglycidyl ether (e.g., Kopoxite from Koppers C., Inc), and a methylolated bisphenol A epoxy resin (e.g., Apogen 101 made by Schaefer Chemical Co.).

Another type of epoxide containing 1,2-epoxide radicals is made by epoxidation of dienes or polyenes. Commercial examples of these epoxides include vinylcyclohexene dioxide (e.g. "ERL-4206" from Union Carbide Corp.), 3,4-epoxycyclohexylmethyl 3,4-epoxycyclohexane carboxylate (e.g. "ERL-4221" from Union Carbide Corp.), 3,4-epxoy-6-methylcyclohexylmethyl 3,4-epoxy-6-methylcyclohexane carboxylate (e.g. "ERL-4201" from Union Carbide Corp.), bis(3,4-epoxy-6-methylcyclohexylmethyl)adipate (e.g. "ERL-4289" from Union Carbide Corp.), bis(2,3-epoxycyclopentyl) ether (e.g., "ERL-0400" from Union Carbide Corp.), dipentene dioxide (e.g. "ERL-4269" from Union Carbide Corp.) 2-(3,4-epoxycyclohexyl-5, 5-spiro-3,4-epoxy) cyclohexane-metadioxane (e.g. "ERL-4234" from Union Carbide Corp.), and epoxidized polybutadiene (e.g. "Oxiron 2001" from FMC Corp.).

Other suitable epoxidized polyenes include epoxidized natural oils including soybean oil, tung oil, and linseed oil. These materials contain a distribution of mono and polyunsaturated oligomers.

In general, the epoxide is composed of oligomers containing two or more 1,2-epoxide radicals. It is possible to add to the epoxide component monoepoxides such as styrene oxide, propylene oxide, epoxycyclohexane, glycidyl esters of monocarboxylic acids and the like. In general, these components will reduce the water sorption tendencies of the cured composition in much the same manner as epoxides containing two or more 1,2-diepoxide radicals. Amounts of monoepoxides of up to 50 percent by weight based on the total epoxide may be used.

The ethylenically unsaturated monomer employed in the composition of this invention is one which forms a liquid homogeneous mixture with maleic anhydride and the half ester structure depicted by formula (I) and the epoxide.

In addition, the ethylenically unsaturated monomer has to be copolymerizable with maleic anhydride and the half esters.

Suitable ethylenically unsaturated monomers which may be employed in the practice of this invention are one or more monomers which contain a

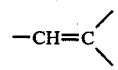

group, and preferably a

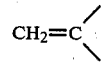

group. These monomers include styrene and its derivatives and homologues, diallyl phthalate, divinylbenzene, acrylic acid or methacrylic acid and their derivatives such as their esters, amides or nitriles, e.g., methyl acrylate, methyl methacrylate, n-butyl methacrylate, acrylamide, methacrylamide, acrylonitrile, methacrylonitrile, and the like. Also the monomers include vinyl ethers and esters, e.g., vinyl acetate vinyl propionate, methyl vinyl ether, and the like, triallyl cyanurate, 1,3-butanediol dimethacrylate, and the like. Mixtures of the aforementioned monomers may be effectively employed in the practice of this invention.

The most preferred ethylenically unsaturated monomer contemplated in the practice of this invention is styrene since it has the most significant commercial utilization for such purposes.

The compositions of this invention contain a molar ratio of half ester to maleic anhydride ranging from about 3:1 to about 200:1, preferably from about 6:1 to about 100:1. In the most typical and desirable embodiment, the mole ratio of half ester to maleic anhydride is from about 10:1 to about 30:1.

The compositions of this invention are desirably produced by effecting an intermixture of the maleic anhydride/organic polyol reaction product, an ethylenically unsaturated monomer and the epoxide. Also, a basic compound may be present in the maleic anhydride/organic polyol reaction product. The basic compound acts, inter alia, as a catalyst for the anhydride/organic polyol reaction.

The basic compound is selected from an amine or a metal salt of an alcohol or carboxylic acid, or a metal oxide or hydroxide.

The metal salt of the alcohol includes sodium methoxide, potassium ethoxide and lithium isopropoxide. The metal salt of a carboxylic acid includes sodium acetate and potassium benzoate. The metal oxide or hydroxides include the alkali metal hydroxides such as potassium hydroxide, and sodium hydroxide. Magnesium oxide is an example of a suitable metal oxide. Characteristic of all the bases which are suitable for use in this invention is that when 1 gram of the basic compound is dissolved in 100 milliters of water the pH is greater than 7.

A preferred basic compound is a secondary or tertiary amine. These amines have a $pK_b$ in the range of 3 to 12.

Amines suitable for use in the practice of this invention include the following:

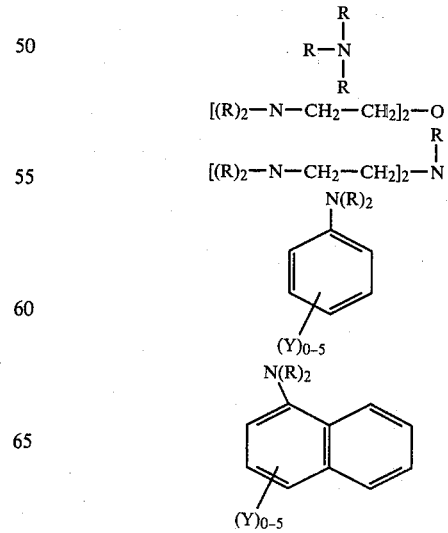

-continued

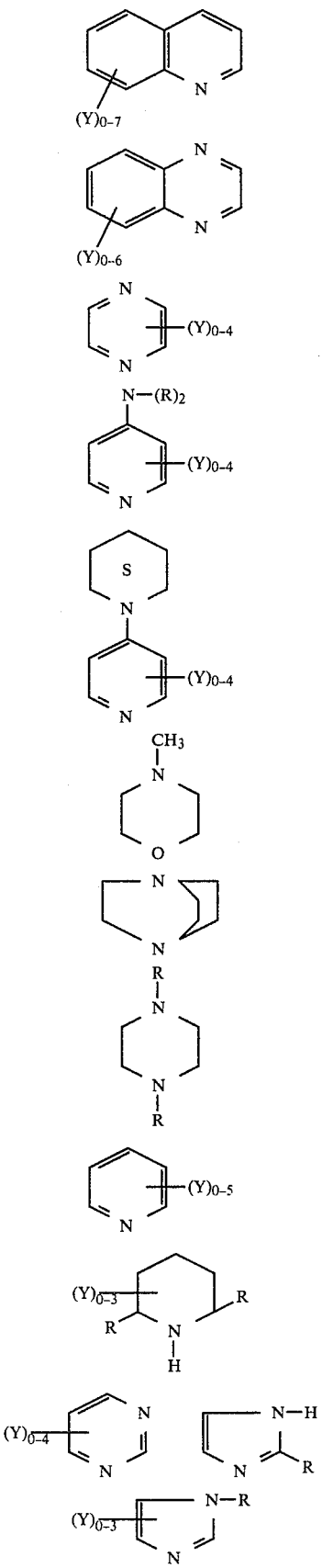

wherein the R's are independently selected from alkyl of 1 to 8 carbon atoms such as $CH_3$, $C_2H_5$, $C_3H_7$, $C_4H_9$, and aralkyl of 7 to 15 carbon atoms such as

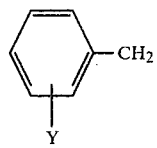

Y is independently selected from alkyl of 1 to 4 carbon atoms, alkoxy of 1 to 4 carbon atoms and halogen.

Additional amines suitable for use herein include 1,5-diazabicyclo [5.4.0]-undec-5-ene; 1,5-diazabicyclo[4.3.0]-non-5-ene.

The compositions of this invention are liquid mixtures at temperatures ranging from about 20° C. to about 70° C. They typically possess room temperature viscosities in the range of about 10 to about 500 centipoises with 40 weight percent of an ethylenically unsaturated monomer, such as styrene. Preferably, with this monomer level, the solution viscosities are between about 20 and about 300 centipoises. The half esters of formula (I) in this invention have molecular weights which range from about 250 to about 900. The acid numbers of the anhydride/polyol reaction products of this invention range from about 70 to about 500. Preferably, the acid number is between about 100 to about 300.

To prepare the half ester of formula (I), the polyol and maleic anhydride are typically combined in a molar ratio of one mole of maleic anhydride per mole of hydroxyl group in the absence of a solvent. The reactants are heated at 60° to 130° C. for one to five hours. These conditions are sufficient to convert more than 75 percent of the original charge of the anhydride to half esters. When a catalytic amount of a basic compound is added to the mixture of reactants, the reaction time can be reduced to less than 30 minutes.

After about 70 percent of the maleic anhydride has reacted, an ethylenically unsaturated monomer may be added. The temperature of the liquid body is rapidly reduced by the desired temperature or to room temperature. The lower temperature is optional and is dependent upon the method used to carry out the process, the type of equipment being used, and the manner in which the composition produced will be utilized.

It is also possible to prepare the maleic anhydride/polyol reaction product directly in the presence of the polymerizable monomer. In this process, a liquid mixture is prepared by blending maleic anhydride, a polyol, a vinyl monomer and a vinyl polymerization inhibitor at a temperature of from about 15° to about 60° C. To this mixture it is desirable to add a catalytic amount of a basic compound such as a tertiary amine. The basic compound catalyzes the in situ formation of half esters from the reaction of the polyol and maleic anhydride. The amount of basic compound employed ranges from about 0.2 to about 2.0 weight percent of the total mixture. The time needed to react more than 70 percent of the maleic anhydride ranges from about 5 minutes to a few days.

In preparing the polyol/anhydride reaction product, the reaction equilibrium between maleic anhydride and organic polyol favors maximum reaction of maleic anhydride at the lowest temperature. When effecting the reaction at elevated temperature, viz, 80° C., an equilibrium composition in which about 80 percent of the maleic anhydride is reacted with the organic polyol to produce the half ester may be achieved within a reasonable time period. When the reaction mixture is cooled to about room temperature, viz., 23° C., more maleic anhydride reacts with the organic polyol and a conversion of more than about 87 mole percent of maleic anhydride is achieved.

The preparation of the polyol/anhydride reaction mixture may be carried out under subatmospheric, atmospheric, and superatmospheric pressure conditions. However, atmospheric pressure conditions are generally used.

The maleic anhydride/polyol reaction is desirably conducted in the absence of water. It is frequently impossible, in a practical operation of this process, to insure that all of the reactants will be absolutely dry and the atmosphere in which the reaction is conducted is totally free of moisture. However, in the practical operation of the present process, water in an amount equivalent to that which could theoretically convert one weight percent of the maleic anhydride used in the reaction to maleic acid can be tolerated. This is preferably considered to be the maximum amount. In the usual case water is present in a relatively trace amount resulting in considerably less than 1 weight percent of the maleic anhydride being reacted to maleic acid.

To insure that the amount of water that gets into the reaction is as low as feasible, it is desirable to utilize an inert moisture free atmosphere in carrying out the reaction. This moisture free atmosphere can be provided by relatively dry gasses such as dry nitrogen, carbon dioxide, methane, helium, argon, and the like.

In carrying out the anhydride/polyol reaction, it is desirable to mix the reactants. The degree of mixing is not critical and gentle stirring of the reaction mass is sufficient. To avoid any complications in the reaction, it is desirable to effectively disperse the basic catalyst, if used, throughout the composition.

The compositions of the instant invention are prepared by blending the maleic anhydride/polyol reaction product with an ethylenically unsaturated monomer, and a component containing 2 or more 1,2-epoxide groups. It is preferred to add the latter component to a mixture of the first two. Blending, which is carried out at temperatures between about 0° and about 90° C., results in the formation of a homogeneous liquid mixture.

When the compositions of this invention are cured, both radical and polar bond forming reactions take place. The ethylenically unsaturated monomer copolymerizes with the carbon-carbon double bonds in the half esters and maleic anhydride under free radical conditions. The terminal carboxyl groups on the half esters and the anhydride portion of maleic anhydride condense with the 1,2-epoxide functionality to form hydroxy esters via a polar mechanism. Additionally, epoxide homopolymerization may occur simultaneously by a polar pathway.

In the preferred embodiment the compositions are cured by use of both a source of free radicals and an epoxide curing catalyst.

Sources of free radicals suitable for curing the instant compositions include electron beam radiation, actinic radiation, azo and peroxide curing agents such as those which are described by Gallagher, et al "Organic Peroxides Review, Plastics Design & Processing", July, 1978, pages 38–42, and August, 1978, pages 60–67, inclusive. The technology disclosed in those two articles is incorporated herein by reference. The choice of the specific peroxide or azo initiators for the purpose of curing the composition of this invention is within the purview of those having skill in this art and the manner in which such peroxides and azo initiators effect a desirable cure is generally characterized in the aforementioned articles.

The instant compositions can be cured in the absence of epoxide curing agents. However, to obtain a faster cure rate and improved properties an epoxide curing catalyst is desirably employed. These catalysts are well known in the art and include, for example, the metal halide Lewis acids, e.g., boron trifluoride, aluminum chloride, zinc chloride, stannic chloride, ferric chloride, boron trifluoride-piperidine complex, boron trifluoride-1,6-hexanediamine complex, boron trifluoride-monoethylamine complex, boron trifluoride-dimethyl ether complex, boron trifluoride-diethyl ether complex, boron trifluoride-dipropyl ether complex, and the like; the strong mineral acids, e.g., phosphoric acid, polyphosphoric acid, and the like; the aliphatic hydrocarbon sulfonic acids and the aromatic hydrocarbon sulfonic acids, e.g., ethanesulfonic acid, propanesulfonic acid, benzenesulfonic acid, toluenesulfonic acid, naphthalenesulfonic acid, lower alkyl substituted-benzenesulfonic acid, and the like; the aliphatic fluoro sulfonic acids, e.g., trifluoromethane sulfonic; the stannous acylates, e.g., stannous acetate, stannous butyrate, stannous hexanoate, stannous octanoate, stannous benzoate, and the like; the stannous salts of perfluoroalkane sulfonic acids, such as tin (II) bis(trifluoromethane sulfonate); the stannic alkoxides, e.g., stannic butoxide, stannic 2-ethylhexoxide, and the like; the alkali metal hydroxides, e.g., sodium hydroxide, potassium hydroxide, and the like; the tertiary amines, e.g., trimethylamine, triethylamine, and the like. For curing compositions containing glycidyl epoxide groups, the boron trifluorideamine complexes and tin salts of perfluoroalkane sulfonic acids are highly preferred. For compositions containing epoxidized dienes, or polyenes, the preferred catalysts are stannous acylates and boron trifluorideamine complexes.

These catalysts are used in amounts of from about 0.01 to about 3.0 percent, based on the weight of the epoxide.

Finally it should be pointed out that many of the basic compounds which catalyze the polyol/maleic anhydride reaction also catalyze reactions between epoxide groups and hydroxyl groups as well as reaction between epoxide groups and carboxylic acid groups.

In order to avoid premature free radical polymerization it is desirable to add polymerization inhibitors to the reaction mixture. These polymerization inhibitors include tertiary butyl catechol, hydroquinone monomethyl or monoethyl ether, benzoquinone, tertiarybutyl hydroquinone, methyl hydroquinone and mixtures thereof, such as mixtures of hydroquinone monomethyl ether and methyl hydroquinone. These polymerization inhibitors are used in amounts of from about 30 to about 600 parts per million by weight.

When an effective level of free radical polymerization inhibitors is present in the instant composition, the pot life (i.e., the time in which the liquid mixture becomes non-flowable due to the onset of crosslinking) depends on several factors, including the functionality of the epoxide, the nature of the epoxide, the functionality of the anhydride/polyol adduct, the level of vinyl monomer in the system, and the type and amount of epoxy catalyst. For example, the combination of a difunctional epoxy components (as opposed to tri- or tetra-functional components), glycidyl epoxides (as opposed to epoxidized olefin epoxides), difunctional maleic anhydride/polyol adducts (as opposed to tris or tetrakis (half esters), a large proportion of ethylenically unsaturated monomer, and a small amount of an epoxy catalyst all favor a long pot life. Under these conditions low viscosity liquid mixtures can be maintained for weeks at room temperature. They may be cured simply by adding a free radical initiator and applying heat.

On the other hand, the onset of gelation of the instant compositions can be effected in less than one minute by the use of highly functionalized epoxide components obtained by epoxidation, low levels of ethylenically unsaturated monomer, and/or a high concentration of an active epoxy catalyst. For example, formulations containing 50 weight percent of 3,4-epoxycyclohexyl-methyl 3,4-epoxy-cyclohexane carboxylate, 40 weight percent of a maleic anhydride/polyol adduct, 9 weight percent of styrene, and 1 weight percent of stannous octoate fall into this category. In view of this enhanced reactivity, such formulations are preferably mixed immediately before curing. An impingement mixing head found in commercial polyurethane reaction injection molding machines or an in-line static mixer may be used to provide effective mixing. The pot life characteristics of the instant composition determine the optimum fabrication schemes.

The instant composition may also be used with fibers. The fibers which are suitable for use with the compositions of this invention as reinforcing agents have a melting point or a glass transition temperature above about 130° C. These fibers include fiberglass, carbon fibers, aromatic polyamide fibers (such as aramid fibers sold by E. I. DuPont Nemours, Wilmington, Delaware under the trademark of Kevlar), metal fibers, such as aluminum and steel fibers, boron fibers and the like. In addition to these fibers, fillers such as calcium carbonate, phenolic spheres, hollow glass spheres, etc, and the like may be included.

The carbon fibers include those having a high Young's modulus of elasticity and high tensile strength. These carbon fibers may be produced from "graphitizable" materials such as is described in U.S. Pat. No. 4,005,183.

The preferred fibers are fiberglass, carbon fibers and aromatic polyamide fibers.

The fibers which are suitable for use with the composition of this invention have a length of at least ¼ inch and the average length is at least ½ inch. Fibers with different lengths exceeding ¼ inch may be used, provided that at least about 50 percent of the fibers have lengths greater than ½ inch. Preferred fibers lengths are from 1 to 2 or more inches. Continuous filaments may also be used.

The compositions herein contain from about 1 to about 60, preferably from about 5 to about 55, and most preferably, from about 10 to about 50 weight percent of the maleic anhydride/polyol reaction product (i.e. the half ester of formula (I) plus maleic anhydride).

The ethylenically unsaturated monomer is present in the present composition in amounts of from about 1 to about 70, preferably from about 3 to about 65, and most preferably from about 5 to about 60 weight percent.

The epoxide is present in the instant composition in amounts of from about 1 to about 90, preferably from about 3 to about 70, and most preferably, from about 8 to about 60 weight percent.

An article molded from the composition of this invention may contain from about 15 to about 80, preferably from about 35 to about 80, and most preferably from about 35 to 70 weight percent of fiber.

These compositions may be molded by a number of different processes and apparatus. A preferred procedure for producing a molded article from the compositions of this invention is described in U.S. Patent Application Ser. No. 135,906 entitled "Molding Process and Apparatus Therefore", and filed on Apr. 14, 1980 in the name of R. Angell, Jr., which is incorporated herein by reference. In this application, a process for rapidly fabricating fiber reinforced thermoset resin articles is described. The fiber reinforcement is comprised of one or more fibers with a melting point or a transition temperature above about 130° C. The process comprises the steps of (a) providing one or more fibers with a melting point or a glass transition temperature above about 130° C. in the form of an interlocked mass in a heatable matched metal die mold, (b) providing in one or more accumulator zones, a liquid body of a thermosettable organic material having a viscosity determined at 120° C., in the absence of curing agent therefore, of less than about 50 centipoise, and which is curable upon heating to a thermoset resin composition, the viscosity of said liquid body being maintained essentially constant in the accumulator zone by keeping its temperature low that at which curing of said material is substantial, (c) closing the mold containing the web, (d) injecting at least a portion of said thermosettable organic material under pressure from said accumulator zone(s) into the mold to thereby fill the cavity in said mold, (e) initiating the curing of said material in said mold by subjecting the material to a temperature above the temperature at which the curing of said material is initiated, by heating the mold, and (f) opening said mold and removing the cured thermoset article therefrom.

In said U.S. Patent Application Ser. No. 135,906 the apparatus comprises: (a) a heatable matched die mold containing one or more cavities therein with means for opening said mold to expose such cavities, and closing the same, and means for controlling the injection of a thermosettable organic liquid to such cavities when the mold is closed, (b) means associated with said mold, whereby one or more fibers in the form of an interlocked mass are provided in a portion of the cavities thereof when the mold is open to expose such cavities and prior to the injection of the thermosettable organic liquid to such cavities when the mold is closed, (c) accumulator means associated with said mold which can contain a thermosettable liquid transportable to means for controlling injection of said liquid to such cavities, (d) cooling means associated with the means for controlling the injection of such liquid to such cavities, whereby the temperature of the liquid in such injection means is maintained substantially below the temperature of the mold.

Another apparatus which may be used is a pressure bag mold.

Due to the low viscosities of the compositions of this invention, they readily flow through and about and within the total confines of the mold and the fibrous material contained therein to effect a uniform distribution of the reaction product within the ultimate molded product.

For compositions of the present invention having a pot life of a few hours or more, the apparatus described in U.S. Application Ser. No. 135,906 containing one or two accumulator zones is entirely adequate for making fiber reinforced composite articles. However, if they possess short pot lives, it is desirable to effect rapid mixing of the two reactive streams just prior to their entry into the mold. This can be accomplished by inserting an impingement mixing head or a static mixer in the nozzle and using two accumulator zones. In this configuration, the polyol/anhydride adduct and the epoxide component can be kept separate until parts are fabricated. The ethylenically unsaturated monomer may be stored in either or both accumulator zones.

The compositions of this invention can also be used to impregnate fabrics, manufacture laid up laminate structures for use in electrical potting and casting processes to protect motors, windings, and the like.

EXAMPLES

The following examples serve to illustrate specific embodiments of this invention and it is not intended that the invention shall be limited by the examples.

EXAMPLE 1

A two liter 4 necked flask fitted with a paddle stirrer, heating mantle, thermometer, a nitrogen inlet, and a nitrogen outlet was charged with 438 g of 2,2,4-trimethyl-1,3-pentanediol and 588 g of maleic anhydride.

The mixture was warmed to 52° C. to give a clear colorless solution. 2.05 g of N-methylimidazole was then added. The reaction mixture immediately became brown and reached a maximum temperature of 80° C. after 23 minutes. The reaction mixture was maintained at 75° to 80° C. for 4.0 hours. At this point a sample was removed. NMR analysis indicated that the maleic anhydride containing components had the following distribution:

73 mole percent maleates (half ester, diesters and maleic acid),
5 mole percent fumarates,
22 mole percent maleic anhydride.

Less than 2 percent of the original maleic anhydride charged was present as either maleic acid or maleate diesters. After standing for 3 days at room temperature, the unreacted maleic anhydride content of the product is less than 12 mole percent of the original charge.

EXAMPLES 2 TO 4

Example 1 was repeated except that the series of polyols as described in Table I were reacted with maleic anhydride at temperatures and for the reaction times described in Table I. The type and amount of amine is described in Table I. In all cases, the unreacted maleic anhydride content of the product at the end of the heating cycle was less than 14 mole percent of the original charge. The products were brown viscous liquids.

EXAMPLES 5 TO 8

The following Examples 5 to 8 describe maleic anhydride/polyol, styrene, epoxide formulations and castings made therefrom. Controls A to D do not contain epoxides. These compositions are formulated to have the same weight ratio of polyol/maleic anhydride reaction product to styrene as in the casting containing the epoxide.

EXAMPLE 5

A solution was prepared from 89.5 g of the reaction product of dipropylene glycol and maleic anhydride prepared as in Example 2, 35 g of a N,N-diglycidyl hydantion derivative with a weight per epoxy equivalent of 138 (XB-2793 available from Ciba Geigy Corp.), 45.5 g of styrene, 1.5 g of t-butyl perbenzoate, 0.15 g of an aqueous solution of Sn(II) bis(trifluoromethane sulfonate) (L-4429 sold by the Minnesota Mining and Manufacturing Co.) and 0.75 g of Zelec UN mold release. The solution was poured between two teflon sheets separated by a ⅛ inch thick neoprene gasket and cured at 65° C. for 16 hours, 85° C. for 4.5 hours and 128° C. for 3 hours. A rigid casting was obtained.

CONTROL A

A solution was prepared from 97.5 g of the reaction product of dipropylene glycol and maleic anhydride, prepared as in Example 2, 52.5 g of styrene, 1.5 g of t-butyl perbenzoate and 0.75 g of Zelec UN mold release. The solution was poured between two teflon sheets separated by a ⅛ inch thick neoprene gasket and cured at 63° C. for 16 hours, 88° C. for 3 hours and 120° C. for 4 hours. A rigid casting was obtained.

EXAMPLE 6

A solution was prepared from 34.5 g of the reaction product of a mixture of 2,2-dimethyl-3-hydroxypropyl 2,2-dimethyl-3-hydroxypropionate and dipropylene glycol with maleic anhydride prepared as in Example 3, 21.9 g of bisphenol-A epoxy resin (Epon 828), 34.5 g of styrene. 0.9 g of t-butyl perbenzoate and 0.22 g of boron trifluoride monoethylamine complex (BF 3.400 sold by Miller Stephenson Chemical Co.). The solution was poured between two teflon sheets separated by a ⅛ inch thick neoprene gasket, cured at 67° C. for 16 hours, 85° C. for 4 hours and 126° C. for 3 hours. A rigid casting was obtained.

CONTROL B

A solution was prepared from 70 g of the reaction product of a mixture of 2,2-dimethyl-3-hydroxypropyl 2,2-dimethyl-3-hydroxypropionate and dipropylene glycol with maleic anhydride prepared as in Example 3, 70 g of styrene. 1.4 g of t-butyl perbenzoate and 0.15 g of Zelec UN mold release. The solution was poured between two teflon sheets separated by a ⅛ inch thick

TABLE I

| Example | Polyol Type | Amount(g) | Amine Type | Amount(g) | Reaction Time(hr.) | Reaction Temperature(°C.) |
|---|---|---|---|---|---|---|
| 2 | Dipropylene glycol | 547.2 | N-methylimidazole | 5.39 | 1.0 | 43–120 |
| 3 | Mixture of 2,2-dimethyl-3-hydroxypropyl 2,2-dimethyl-3-hydroxypropionate and dipropylene glycol | 583<br>199 | N-methylimidazole | 3.26 | 2.0 | 50–100 |
| 4 | 2-mole propoxylate of 2,2-bis(4-hydroxyphenyl)propane | 346 | Pyridine | 2.5 | 2.5 | 69–110 | neoprene gasket, cured at 65° C. for 16 hours, 88° C. for 3 hours and 123° C. for 5 hours. A rigid casting was obtained.

The castings prepared in Examples 5 and 6 and Controls A and B were tested for tensile strength and modulus according to ASTM D-638; elongation at break according to ASTM D-638 and flexural strength and modulus according to ASTM D-790.

Table II lists the results of these tests.

TABLE II

| Example | Maleic Anhydride Capped Polyol[1] | Epoxy Added | Tensile Strength ($10^3$ psi) | Tensile Modulus ($10^6$ psi) | Elongation (percent) | Flexural Strength ($10^3$ psi) | Flexural Modulus ($10^6$ psi) |
|---|---|---|---|---|---|---|---|
| 5 | DPG | Yes | 13.2 | 0.60 | 3.3 | 18.6 | 0.59 |
| Control A | DPG | No | 2.8 | 0.64 | 0.3 | 8.2 | 0.58 |
| 6 | Mixture of ED-204/DPG | Yes | 11.9 | 0.44 | 5.2 | 16.8 | 0.54 |
| Control B | Mixture of ED-204/DPG | No | 4.5 | 0.44 | 1.1 | 9.4 | 0.53 |

[1]ED-204 = 2,2-dimethyl-3-hydroxypropyl 2,2-dimethyl-3-hydroxypropionate
DPG = dipropylene glycol The data in Table II show that castings made from a composition containing an epoxide (Examples 5 and 6) are tougher than those castings made from compositions without epoxide (Controls A and B). The increased toughness is shown by increase in strength properties and an increase in tensile elongation. The simultaneous increase in both strength and elongation is unexpected. In general, with most modifiers, the increase in one of these properties is accompanied by a decrease in the other.

EXAMPLE 7

A solution was prepared from 71.5 g of the reaction product of the 2-mole propoxylate of 2,2-bis-(4-hydroxyphenyl)propane with maleic anhydride prepared as in Example 4, 20 g of bisphenol A epoxy resin (Epon 828), 58.5 g of styrene, 1.5 g of 1-t-butylazo-1-cyanocyclohexane, 0.4 g of boron trifluoride monoethylamine complex (BF3.400), and 1.0 g of Zelec UN mold release. The solution was poured between two teflon sheets separated by a ⅛ inch thick neoprene gasket and cured at 63° C. for 16 hours, 88° C. for 3 hours, and 120° C. for 4 hours. A rigid casting was obtained.

CONTROL C

A solution was prepared from 77 g of the reaction product of the 2-mole propoxylate of 2,2-bis(4-hydroxyphenyl)propane with maleic anhydride prepared as in Example 4, 63 g of styrene, 1.4 g of 1-t-butylazo-1-cyanocyclohexane and 0.42 g of Zelec UN mold release. The solution was poured between two teflon sheets separated by a ⅛ inch thick neoprene gasket and cured at 60° C. for 16 hours, 85° C. for 2 hours and 125° C. for 5 hours. A rigid casting was obtained.

EXAMPLE 8

A solution was prepared from 76.7 g of the reaction product of 2,2,4-trimethyl-1,3-pentanediol and maleic anhydride prepared as in Example 1, 20 g. of a bisphenol-A epoxy resin (Epon 828; sold by Shell Chemical Co. and with the weight per epoxy equivalent of 190), 53.3 g. of styrene, 1.5 g of t-butyl perbenzoate, 0.45 g of stannous octoate and 1.0 g of Zelec UN mold release. The solution was poured between two teflon sheets separated by a ⅛ inch neoprene gasket, cured at 65° C. for 16 hours, 85° C. for 4.5 hours and 128° C. for 3 hours. A rigid casting was obtained.

CONTROL D

A solution was prepared from 88.5 g of the reaction product of 2,2,4-trimethyl-1,3-pentanediol and maleic anhydride prepared as in Example 1, 61.5 g of styrene, 1.5 g of t-butyl perbenzoate and 6.75 g of Zelec UN mold release. The solution was poured between two teflon sheets separated by a ⅛ inch thick neoprene gasket, cured at 63° C. for 16 hours, 88° C. for 3 hours, and 120° C. for 4 hours. A rigid casting was obtained.

The castings prepared in Examples 5 through 8 and Controls A through D were testd to determine water sorption characteristics. This property is related to suitability for long-term use in environments having high humidity or requiring continuous contact with aqueous solutions. A low value of water sorption is preferred since it indicates that less plasticization of the cured resin has occurred.

Pieces of castings from the Examples and Controls were boiled for two hours in water, removed from the water bath, cooled to room temperature and weighed. The weight of each piece was compared with the weight measured before the test. The increase in weight is given in Table III. The samples were then boiled for an additional two hours (four hours total), and the percent increase in weight was again determined.

Table III shows that the addition of a compound containing epoxide groups to the resin formulation (Examples 5 to 8) results in a decreased water sorption for cured castings compared to the control formulation which do not contain epoxide (Controls A to D).

TABLE III

Water Sorption of Castings. Percent gain after water boil.

| Example | Maleic Anhydride Capped Polyol[1] | Epoxy added | Duration of water boil | |
|---|---|---|---|---|
| | | | Two hours (% gain) | Four hours (% gain) |
| 5 | DPG | Yes | 3.4 | 6.0 |
| Control A | DPG | No | 4.8 | 9.8 |
| 6 | Mixture of ED-204/DPG | Yes | 1.2 | 1.8 |
| Control B | Mixture of ED-204/DPG | No | 1.8 | 2.3 |
| 7 | Propoxylate of Bisphenol-A | Yes | 0.8 | 1.2 |
| Control C | Propoxylate of Bisphenol-A | No | 0.9 | 1.9 |
| 8 | TMPD | Yes | 1.4 | 1.9 |
| Control D | TMPD | No | 1.6 | 2.9[2] |

[1]ED-204 = 2,2-dimethyl-3-hydroxypropyl 2,2-dimethyl-3-hydroxypropionate
TMPD = 2,2,4-trimethyl-1,3-pentanediol
DPG = dipropylene glycol
[2]Cracked on cooling to room temperature

EXAMPLE 9

A solution was prepared from 244 g of the reaction product of dipropylene glycol and maleic anhydride prepared as in Example 2, 131 g of styrene, 0.10 g of t-butyl hydroquinone, 37.5 g of a polyglycidyl ether of a phenol-formaldehyde novolak with a weight per epoxy equivalent of 180 (D.E.N. 438 made by Down Chemical Co.), 3.0 g of Zelec UN mold release, 4.4 g of t-butyl perbenzoate and 1.5 g of an aqueous solution of Sn(II) bis(trifluoromethane sulfonate) [L-4429]. A portion of the resin was applied to 132 g of a random glass mat (PPG type AKM) in a 10×10×1/10 inch cavity mold. The composite was cured at 157° C. for 3 minutes. A yellow, translucent composite was removed from the mold and tested to determine tensile strength and modulus, elongation, flexural strength and modulus, by the test produces described above. Glass content was determined by ashing and found to be 56 weight percent.

The results are as follows:

| | |
|---|---|
| Tensile strength ($10^3$ psi) | 25.5 |
| Tensile modulus ($10^6$ psi) | 1.59 |
| Elongation (%) | 1.93 |
| Flexural strength ($10^3$ psi) | 50.2 |
| Flexural modulus ($10^6$ psi) | 2.16 |

The data show that a composite produced with a composition containing an epoxide according to the present invention, possess an excellent combination of mechanical properties.

What is claimed is:

1. A curable polymerizable liquid mixture comprising (a) a half ester characterized by the following

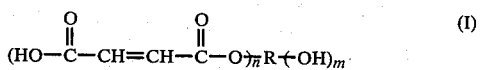

wherein n is a number having an average value of about 1.5 to less than about 4, m is equal to the free valence of R less the average value of n, R is the hydroxyl-free residue of an organic polyol which contained from 2 to 4 inclusive, hydroxyl groups, OH, in formula (I), (b) maleic anhydride, (c) an epoxide containing two or more 1,2-epoxide radicals, (d) an ethylenically unsaturated monomer which forms a liquid homogeneous mixture with the half ester, maleic anhydride and the epoxide, and (e) a basic compound.

2. A mixture as in claim 1 wherein the organic polyol is selected from the group consisting of ethylene glycol, diethylene glycol, 2,2,4-trimethyl-1,3-pentanediol, propylene glycol, dipropylene glycol and polypropylene glycol having an average molecular weight of between about 150 to about 600 and having 2 to 4 terminal hydroxyl groups, 2,2-dimethyl-3-hydroxypropyl 2,2-dimethyl-3-hydroxypropionate, ethylene and propylene oxide adducts of bisphenol A, 2,2-dimethyl-1,3-propanediol, 1,3-butanediol, and 1,4-butanediol.

3. A mixture as in claim 1 wherein the organic polyol is a mixture of polyols.

4. A mixture as in claim 1 wherein the maleic anhydride content does not exceed a total of about 25 mole percent of the amount of maleic anhydride used in producing the half ester (a).

5. A mixture as in claim 1 wherein the combined amount of the half ester of formula (I) and maleic anhydride is from about 1 to about 60 weight percent.

6. A mixture as in claim 1 wherein the epoxide is a polyglycidyl compound.

7. A mixture as in claim 1 wherein the epoxide is derived from the epoxidation of a diene or polyene.

8. A mixture as in claim 7 wherein the epoxide is selected from 3,4-epoxycyclohexylmethyl 3,4-epoxycyclohexane carboxylate, 3,4-epoxy-6-methylcyclohexylmethyl, 3,4-epoxy-6-methylcyclohexane carboxylate, bis(2,3-epoxy-cyclopentyl)ether, epoxidized polybutadiene, epoxidized soybean oil, bis(3,4-epoxy-6-methylcyclohexylmethyl)adipate, vinyl cyclohexene dioxide, 2-(3,4-epoxy-cyclohexyl-5,5-spiro-3,4-epoxy) cyclohexane-metadioxane and dipentene dioxide.

9. A mixture as in claim 1 wherein the epoxide is a copolymer of an acrylic acid ester of glycidol.

10. A mixture as in claim 1 wherein the composition contains a monoepoxide.

11. A mixture as in claim 1 wherein the epoxide is present in amounts of from about 1 to about 90 weight percent.

12. A mixture as in claim 1 wherein the ethylenically unsaturated monomer is selected from styrene, α-methylstyrene, the lower alkyl esters of acrylic acid and methacrylic acid, and acrylonitrile.

13. A mixture as in claim 1 wherein the ethylenically unsaturated monomer is present in amounts of from about 1 to about 70 weight percent.

14. A mixture as in claim 1 wherein the basic compound is selected from an amine, a metal hydroxide or a metal salt of an organic acid or alcohol.

15. A mixture as in claim 14 wherein the basic compound is present in amounts of from about 0.02 to about 2 weight percent, based on the combined weight of polyol and maleic anhydride.

16. A mixture as in claim 1 which contains an epoxide curing catalyst.

17. A mixture as in claim 1 which is cured by a free radical source.

18. A cured molded article prepared from the mixture of claims 1, or 16, or 17.

* * * * *